(12) United States Patent
Moulton et al.

(10) Patent No.: US 8,679,368 B2
(45) Date of Patent: Mar. 25, 2014

(54) SYNTHETIC HYDROCARBON PRODUCTION BY DIRECT REDUCTION OF CARBONACEOUS MATERIALS WITH SYNTHESIS GAS

(75) Inventors: David S. Moulton, Hondo, TX (US); Jimell Erwin, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 37 days.

(21) Appl. No.: 12/976,577

(22) Filed: Dec. 22, 2010

(65) Prior Publication Data

US 2012/0161077 A1 Jun. 28, 2012

(51) Int. Cl.
*C10G 1/06* (2006.01)
*C01B 3/38* (2006.01)

(52) U.S. Cl.
USPC .......................... 252/373; 208/403

(58) Field of Classification Search
USPC .......................... 252/373; 208/403
See application file for complete search history.

(56) References Cited

U.S. PATENT DOCUMENTS

| | | | |
|---|---|---|---|
| 4,202,757 A | 5/1980 | Amendola | |
| 4,229,184 A | 10/1980 | Gregg | |
| 5,071,540 A * | 12/1991 | Culross et al. | 208/414 |
| 5,783,065 A * | 7/1998 | Wiser et al. | 208/400 |
| 6,946,053 B2 | 9/2005 | Donohoe | |
| 2009/0152171 A1 | 6/2009 | Zhang et al. | |
| 2010/0180805 A1* | 7/2010 | Cheiky | 110/203 |

OTHER PUBLICATIONS

U.S. Office Action issued Apr. 16, 2012 in related U.S. Appl. No. 13/015,206.
He, et al "Mechanism of Coal Gasification in a Steam Medium Under Arc Plasma Conditions"; Plasma Sources Science and Technology 13 (2004) pp. 446-453.
Chen, et al., "Temperature and Velocity Measurements in Turbulent Argon—Helium Plasma Jets," dated Aug. 1991, available at 134.147.148.178/ispcdocs/ispc10/content/10/10-1.2-12.pdf (6 pages).
Czernichowski, et al., "Cold-Plasma Reduction of Flue-Gas SOx to Elemental Sulfur," International Union of Pure and Applied Chemistry, 11th International Symposium on Plasma Chemistry, England, Aug. 22-27, 1993 Symposium Proceedings vol. 2, pp. 674-679; also available online at 134.147.148.178/ispcdocs/ispc11/content/11/11-0674.pdf.
Ergun, "Kinetics of the Reaction of Carbon Dioxide with Carbon," J. Phys. Chem., 1956, 60 (4), pp. 480-485.
Futamura, et al., "Synthesis Gas Production from CO2 and H2O with Nonthermal Plasma," Studies in Surface Science and Catalysis, vol. 153, 2004, pp. 119-124.

(Continued)

*Primary Examiner* — Melvin C Mayes
*Assistant Examiner* — Kenneth Vaden
(74) *Attorney, Agent, or Firm* — Grossman, Tucker et al

(57) ABSTRACT

A process for the liquefaction of carbonaceous material is described that utilizes a single liquefaction reactor that accepts mixtures of carbon monoxide and hydrogen (syngas) at any ratio and which provides for a water gas shift reaction and a hydrogenation reaction of the carbonaceous material to provide a desired hydrocarbon. The process avoids the use of a separate reactor for the water gas shift reaction and applies to carbonaceous material such as any type of coal and/or biomass containing plant and/or animal matter for conversion to a synthetic fuel.

23 Claims, 4 Drawing Sheets

(56) References Cited

OTHER PUBLICATIONS

He, et al., "The formation mechanism of CO2 and its conversion in the process of coal gasification under arc plasma conditions," Plasma Sources Science and Technology vol. 15, pp. 246-252. (2006).

Kalinenko, et al., "Pulverized Coal Plasma Gasification," Plasma Chemistry and Plasma Processing vol. 13, No. 1, 1993, pp. 141-167.

Liu, "Non-thermal plasma approaches in CO2 Utilization," Fuel Processing Technology, vol. 58, Issues 2-3, Mar. 1999, pp. 119-134.

Mizuno, et al., "A Method for the Removal of sulfur Dioxide from Exhaust Gas Utilizing Pulse Streamer Corona for Electron Energization," IEEE Transactions on Industry Applications, vol. 1A-22, No. 3, May/Jun. 1986, pp. 516-522.

Morova, et al., "Plasma Technologies for Reducing CO2 Emissions from Combustion Exhaust with Toxic Admixtures to Utilisable Products," Journal of Thermal Analysis and Calorimetry, vol. 61 (2000) 273-287.

Poncin-Epaillard, et al., "Study of the Interactions Between Carbone Dioxide Plasma and Polypropylene," ISPC-14, Prague, Czech Republic, Aug. 2-6, 1999, Edited by M. Hrabovsky, p. 1889-1894.

Qiu, et al., "Coal gasification in steam and air medium under plasma conditions: a preliminary study," Fuel Processing Technology, vol. 85, Issues 8-10, Jul. 15, 2004, pp. 969-982.

Smith, et al., "Induction-coupled Plasma Energy Recycle and Conversion (PERC) of Military Waste Streams," 12th International Symposium on Plasma Chemistry and Plasma Proceedings vol. II, Aug. 21-25, 1995, pp. 1057-1062.

Smith, et al., "Reactive Plasma Spray Forming of Nitride/Nitrogen Composite Materials," 11th International Symposium on Plasma Chemistry. vol. 1; Loughborough, Leicestershire; United Kingdom; Aug. 22-27, 1993. pp. 139-144.

Wang, et al., "A Feasibility Study of Synthesis of Oxygenates Directly from Methane and Carbon Dioxide Using Dielectric-barrier Discharges," Studies in Surface Science and Catalysis, vol. 153, 2004, pp. 109-118.

U.S. Office Action issued Nov. 1, 2012 in U.S. Appl. No. 13/015,206 (16 pgs.).

Kamel, etal, "Brown Coal Conversion by Microwave Plasma Reactions Under Successive Supply of Methane"; Fuel vol. 77, No. 13, 1998. pp. 1503-1506, Elsevier Science Ltd., Printed in Great Britain.

Larson, et al., "Synthetic fuel production by indirect coal liquefaction," Energy for Sustainable Development, vol. VII, No. 4, Dec. 2003.

Pei, et al., "Experimental research on catalysts and their catalytic mechanism for hydrogen production by gasification of peanut shell in supercritical water," Frontiers of Energy and Power Engineering in China vol. 1, No. 4, 451-456, 2007.

Wood, et al., "Coal Liquefaction in Coiled Tube Reactors," Ind. Eng. Chem. Process Des. Dev., 1976, 15 (1), pp. 144-149.

Kawa, et al., "Hydrogenation of Asphaltene from Coal using Halide Catalysts," Symposium on Hydrogen Processing of Solid and Liquid Fuels Presented Before the Division of Petroleum Chemistry, Inc., American Chemical Society, Chicago Meeting, Sep. 13-18, 1970. pp. A23-A28.

Zielke, et al., "Moltem Zinc Halide Catalysts for Hydrocracking Coal Extract and Coal," Ind. Eng. Chem. Process Des. Dev., 1966, 5 (2), pp. 158-164.

Grens II, et al., "Coal Liquefaction Catalysis by Zinc Chloride Melts in Combination with Organic Solvents," Ind. Eng. Chem. Process Des. Dev., 1980, 19 (3), pp. 396-401.

* cited by examiner

SYNTHETIC HYDROCARBON PRODUCTION BY DIRECT REDUCTION OF CARBONACEOUS MATERIALS WITH SYNTHESIS GAS

STATEMENT REGARDING FEDERALLY SPONSORED RESEARCH OR DEVELOPMENT

This invention was made with United States Government support under Contract No. HR0011-09-C-0094 awarded by the U.S. Defense Advanced Research Projects Agency. The Government has certain rights in this invention.

FIELD OF THE INVENTION

The present disclosure is directed at the conversion of carbonaceous materials to synthetic hydrocarbons which may be utilized as a feed stock for fuels and/or chemical manufacturing. More specifically, the disclosure relates to the catalytically promoted water gas shift reaction and coal hydrogenation reaction which may now be carried out in a single vessel allowing for the elimination of a separate processing step for gas composition adjustment.

BACKGROUND

On the basis of cost per unit of energy obtained by combustion, coal is generally less expensive than petroleum. Two approaches are presently employed for conversion of coal to synthetic petroleum that may then be used as feed stocks for manufacturing fuels and chemicals similar to those made from conventional petroleum.

One principal processing approach is called "direct liquefaction" that includes: 1. gasification of part of the coal by partial combustion to produce a gaseous product containing both hydrogen and carbon monoxide (syngas): 2. changing the composition of the gas stream to substantially all hydrogen by reacting the carbon monoxide with water to produce both additional hydrogen and carbon dioxide with removal of the carbon dioxide; and 3. chemical reaction of the hydrogen stream thus formed with the remaining coal at a suitable combination of temperature and pressure in the presence of a catalyst and a hydrogen transfer liquid, to transform the coal to synthetic petroleum (liquefaction).

The principal processing steps in the approach called "indirect liquefaction" include: 1. gasification of all of the coal by partial combustion to produce a gaseous product containing both hydrogen and carbon monoxide (syngas); 2. adjusting the hydrogen content of the gas by reacting part of the carbon monoxide with water to produce both hydrogen and carbon dioxide with removal of the carbon dioxide, to produce a stream containing a preferred composition of hydrogen and carbon monoxide; and 3. reacting the hydrogen and carbon monoxide at a suitable combination of temperature and pressure in the presence of a catalyst to make paraffinic hydrocarbons (liquefaction). This reaction is widely known as the "Fischer-Tropsch" synthesis and the products provide suitable feed stocks for many fuel and chemical production processes. However the Fischer-Tropsch products are deficient in hydrocarbons with cyclic chemical structures including aromatics (e.g. toluene) or cycloaliphatics (e.g. cyclohexane).

Both of these conventional processes use the reaction of carbon monoxide with water, widely known as the "water gas shift reaction" or "WGSR" as a significant and separate processing step to adjust the composition of the reacting gas stream to a preferred composition. That WGSR may be summarized as follows:

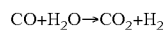

$$CO + H_2O \rightarrow CO_2 + H_2$$

The water gas shift reaction noted above, which is utilized to adjust the ratio of $H_2$ to CO in the syngas to provide an optimal ratio for downstream processing, is, as noted, typically carried-out in a separate stand-alone reactor. This then eventually provides a suitable feed for the coal liquefaction reactor. The present invention is, among other things, directed at elimination of this separate reactor for the WGSR and improvement of the overall processes economics, along with the application of such process to all types of coal and the formation of products that also include cyclic organic compounds that may be particularly preferred for selected fuels and other chemical manufacturing requirements.

SUMMARY

A process for the liquefaction of carbonaceous material comprising: (a) providing a carbonaceous material and feeding a portion to a gasification reactor and forming hydrogen and carbon monoxide; (b) feeding the gaseous products of the gasification reactor with water and additional carbonaceous material into a liquefaction reactor containing an inorganic metal halide salt wherein said gaseous products undergo both of the following: (i) a water gas shift reaction wherein the carbon monoxide and water react to form carbon dioxide and hydrogen; and (ii) a hydrogenation reaction of the carbonaceous material wherein said material is converted to a hydrocarbon. Furthermore, in step (a) one may feed one or more of water, carbon dioxide or oxygen to the gasification reactor. In addition, in step (b), one may feed the contents of the gasification reactor, including unreacted carbonaceous material, into the liquefaction reactor along with additional carbonaceous material and water.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

The present invention relates to a catalytically promoted water gas shift reaction and carbonaceous material hydrogenation reaction which may be carried out in a single vessel allowing for the elimination of a separate processing step for gas composition adjustment. The process of this invention may therefore provide advantages over both of the conventional approaches (direct liquefaction or indirect liquefaction). More specifically, the elimination of the separate gas composition adjustment processes required by both conventional direct and indirect liquefaction methods may now reduce both the capital and operating costs for the process of this invention.

Figure 1:
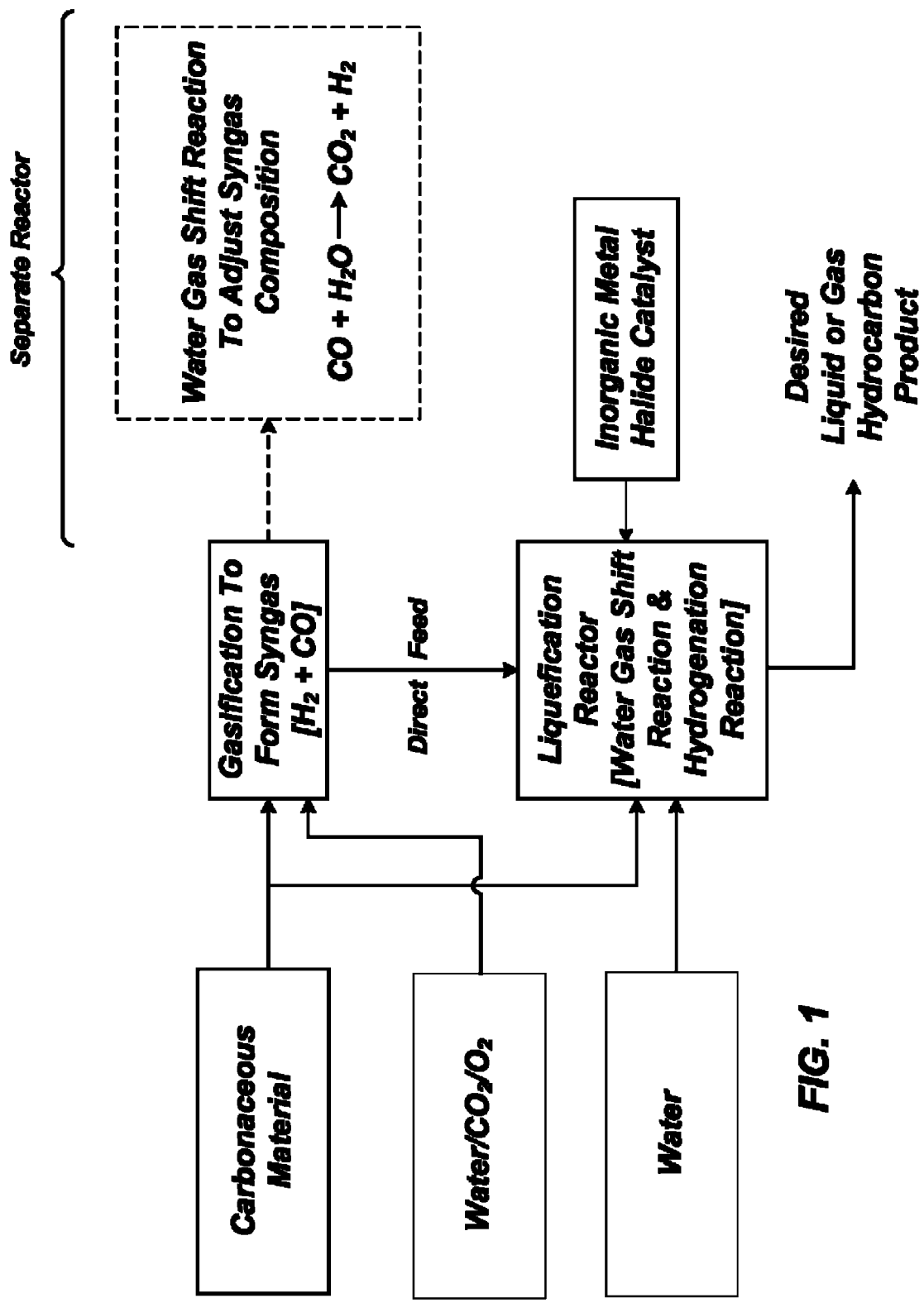
FIG. 1 is a general process flow diagram illustrating the formation of liquid hydrocarbon products according to a generally applicable embodiment of the present invention that has the ability to eliminate the separate reactor that is typically employed for the indicated water gas shift reaction.

With attention now directed to FIG. 1 a general overview of the present invention is initially provided. As can be seen, a portion of the carbonaceous material, as defined herein, and which preferably comprises coal, initially undergoes gasification in a gasification reactor in the presence of oxygen and/or carbon dioxide and/or water to form syngas ($H_2$+CO). The gasification reactor for such step may be of any functional design for gasification of carbonaceous material and is not at all limited in the context of the present invention.

Following gasification, and as noted herein, typically, the gaseous products of gasification are introduced to a separate reactor where they undergo a water gas shift reaction to react the carbon monoxide with water to form carbon dioxide and hydrogen, which therefore adjusts the syngas composition. This separate processing step within a separate and dedicated reactor is now obviated by the present invention. Accordingly, as illustrated in FIG. 1, the gasification products ($H_2$ and CO) are now fed directly to the liquefaction or reduction reactor along with a separate portion of the carbonaceous material, as opposed to the use of the "separate reactor" as illustrated. The liquefaction reactor also contains an inorganic metal halide salt catalyst as discussed more fully below. Accordingly, within the liquefaction reactor there may now be simultaneous production of additional hydrogen via the water shift reaction along with the hydrogenation of remaining carbonaceous material to provide a desired liquid or gaseous hydrocarbon product. One such hydrogenation reaction may be described as:

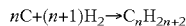

$$nC+(n+1)H_2 \rightarrow C_nH_{2n+2}$$

It may therefore be appreciated that one aspect of the present invention is that within the liquefaction reactor some hydrogen is produced and some hydrogen is simultaneously consumed.

To promote the reactions taking place in the liquefaction reactor, such reactor may include packing materials such as Raschig rings, ceramic saddles or other suitable shaped materials. The presence of such packing materials may improve gas and liquid mixing and/or the ability to cause coalescence of bubbles and the dispersion of foam that may be formed in such reactor and/or improve the heat transfer to therefore support control of the reactor to achieve the desired internal temperature range.

Figure 2:
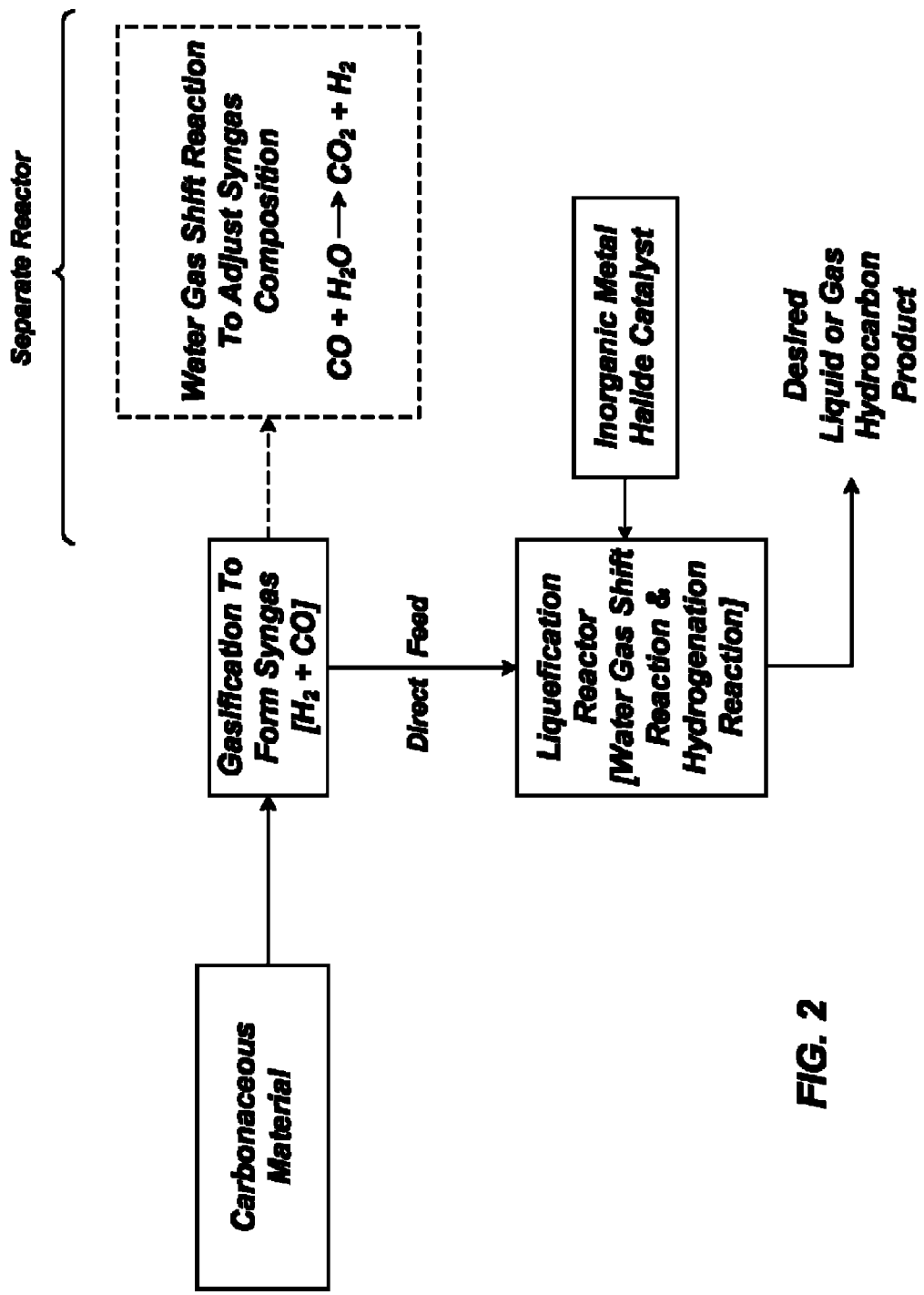
FIG. 2 is a process flow diagram illustrating the formation of liquid hydrocarbon products according to a particular case of the present invention wherein excess, unreacted carbonaceous material from the gasification reactor can be hydrogenated in the liquefaction reactor, with the ability to eliminate the separate reactor that is typically employed for the indicated water gas shift reaction.

Attention is directed to FIG. 2 which shows a particular case of the present invention wherein unreacted carbonaceous material from the gasification has the property of being capable of hydrogenation. As shown in FIG. 1, separate portions of the carbonaceous material would normally be supplied to the gasification reactor and the liquefaction reactor. However, it is possible that some carbonaceous material could be used in a gasification reactor under conditions that would provide a char or unreacted product capable of hydrogenation. In that circumstance, unreacted carbonaceous material from the gasification reactor could provide all or part of the carbonaceous material feed to the liquefaction reactor. It should be noted that one problem is that the gasification reaction utilizes relatively high temperatures such that any left over carbonaceous material may be a hard char that is relatively difficult to hydrogenate. Separating the carbonaceous material as illustrated in FIG. 1 is therefore technically more efficient and relatively safer in practice.

In addition, water, carbon dioxide and/or oxygen may be alternate sources of oxygen needed in the feed to the gasification reactor and water may be included in the feed to the liquefaction reactor. In the gasification reactor, all three (water, carbon dioxide and oxygen) provide oxygen and molecular oxygen provides a relatively high amount of heat. It should be noted that air is not preferred for such application because it is relatively easier to separate nitrogen from oxygen than to separate nitrogen from carbon monoxide. In addition, introducing a significant amount of nitrogen into the liquefaction reactor would cause a relatively large increase in process costs for compressing and heating the nitrogen, which would not participate in the liquefaction reaction at all.

In the process of the present invention the catalyst in a liquid medium may itself serve as a hydrogen transfer liquid to carry the hydrogen from the gas phase to the coal particles and a separate hydrogen transfer liquid such as tetralin or a substituted tetralin that is commonly used in direct liquefaction is not required at temperatures above about 300° C. However, a separate hydrogen transfer liquid may be used if preferred. Such liquid may therefore include any organic liquid that can be hydrogenated and dehydrogenated within the liquefaction reactor.

The feedstocks suitable for use herein may include a carbonaceous material which may be understood as any substrate material containing carbon suitable for conversion to a synthetic fuel. Preferably, the carbon may be present in such materials at levels of greater than 50.0% by weight. Preferably, the feedstock herein first includes coal material from coal beds or coal seams. The coal may include various rank coals, such as lignite or brown coal that may provide about 6800 BTU/lb, subbituminous coal that may provide about 8250 BTU/lb, bituminuous coal that may provide about 12,900 BTU/lb and anthracite coal which may provide about 13,500 BTU/lb. In addition, the feedstock herein may comprise mixtures of any one or more of the previous mentioned coal materials.

Furthermore, the carbonaceous material substrate herein may include asphalt which may be understood as a solid or semi-solid mixture of bitumens that may be obtained from native deposits or as a petroleum by-product. As may therefore be appreciated, asphalt can provide various hydrocarbon mixtures suitable as a substrate for conversion according to the general process disclosed herein.

Moreover, the solid carbonaceous feedstock herein may extend to include biomass which is a reference to any plant or animal matter available or developed as a renewable energy source (i.e. plant or animal matter developed for the purpose of conversion to a synthetic fuel). The carbonaceous material herein may therefore include cellulosic type material, and in particular, waste cellulosic material available from consumer recycling. Accordingly, by way of example only, the carbonaceous material herein may specifically include wood chips, algae, sugar cane fiber, nut shells, or cardboard.

Preferably, the carbonaceous material that is ultimately selected, when solid, may be first ground to increase its available surface area for the ensuing chemical reactions. In addition, such grinding may facilitate the formation of slurries of solid carbonaceous material in liquid which may then provide sufficient stability for pumping and conveyance into the liquefaction reactor. For example, the particle size of the solid carbonaceous material herein (largest linear dimension) may be less than or equal to 200 microns, and preferably in the range of 100-200 microns. The particle size of the preferred raw coal may be reduced by any conventional procedure such as pulverization or other comparable physical size reduction methodology. The liquid for the slurry may be water, catalyst as described herein, hydrogen transfer liquid or any mixture of these at a temperature high enough to be in the liquid state.

As noted above, the catalyst within the liquefaction reactor may comprise one or more inorganic metal halide salts suitable for the water gas shift reaction. Such may therefore include metal halide salts such as zinc chloride ($ZnCl_2$), zinc bromide ($ZnBr_2$), iron chloride ($FeCl_3$), tin chloride ($SnCl_2$), titanium chloride ($TiCl_2$), titanium tetrachloride ($TiCl_4$), bismuth chloride ($BiCl_3$), etc. Preferably the metal halide salt comprises zinc chloride ($ZnCl_2$). The weight ratio of the zinc chloride to the carbonaceous material within the liquefaction reactor is preferably greater than or equal to 1.0. The weight ratio may also have any one of the following individual values: 2.0, 3.0, 4.0, 5.0, 6.0, 7.0, 8.0, 9.0 and 10.0.

The inorganic metal catalyst herein may be augmented in its activity to promote the water gas shift reaction and hydrogenation reaction of the carbonaceous material substrate by the addition of an inorganic acid. For example, one may include an inorganic halide acid such hydrogen chloride (HCl). Such inorganic halide acid may be present in an amount of less than or equal to 5 mole percent of the metal halide salt that is present. The use of the inorganic halide acid is designed to maintain the inorganic halide salt in its catalytic form and to minimize its conversion to other non-catalytic derivatives in the reactor environment.

The weight ratio of the catalyst to the water in the liquefaction reactor may also be adjusted. Preferably, the weight ratio of the catalyst to the water may have a value equal to or greater than 2.0. The weight ratio of the catalyst to the water may have other individual values, such as 3.0, 4.0, 5.0 and 6.0. It should be noted that this weight ratio includes the moisture contained within the coal or other carbonaceous material present.

Another variable that is preferably adjusted is the weight ratio of syngas to the carbonaceous material. This may be expressed in terms of gram-moles of syngas to grams of carbonaceous material. It may therefore be appreciated that for the syngas, 28 grams of CO is one gram-mole of CO and 2 grams of hydrogen is one gram-mole of hydrogen. The weight of a gram mole of syngas may therefore be determined based upon the relative concentration of CO and hydrogen for a given syngas composition. Accordingly, the ratio of syngas to carbonaceous material may be in the range of at or above 2 gram-moles of syngas to 100 gram of carbonaceous material. Preferably, the ratio of syngas to carbonaceous material may in the range of 2-gram-moles of syngas to 10-gram moles of syngas for 100 grams of carbonaceous material.

The processing variables within the liquefaction reactor include temperature, pressure and reaction time. The temperature range may be between 250° C. to 1000° C. including all values and increments therein. Preferably, the temperature range is 250° C. to 750° C., more preferably 350° C. to 450° C., and in one particularly preferred embodiment, the temperature range is 350° C. to 410° C. It can be appreciated that higher relative temperatures provide higher relative reaction rates and that relatively lower temperatures provide more favorable thermodynamic equilibria for both the water gas shift reaction and for hydrogenation reactions.

Pressure within the liquefaction reactor may be in range of 250 psi-7500 psi. Preferably, the pressure is at or above 500 psi and in the range of 500 psi-5000 psi. Reaction rates may understandably vary with combinations of temperatures and pressures adjusted to favoring higher relative reaction rates.

In general, relatively higher pressures favor more complete conversion and can be used to compensate for the reduction in complete conversion associated with higher temperatures. In addition, reaction time may be in the range of less than or equal to 2.0 hours, and more preferably, within the range of 1.0-2.0 hours.

Product recovery and separation follows the reduction reactor and can be accomplished by any practical means. For example, the pressure may be reduced rapidly by using a unit operation known as an adiabatic flash, in which the pressure is reduced without significant transfer of heat in or out of the material. The drop in pressure causes water and lower boiling product hydrocarbons to vaporize and separate from the ash, char, unconverted coal or other carbonaceous material, and higher boiling hydrocarbons. The lower boiling hydrocarbons and water are condensed and separated by other well-known procedures. The product gases, containing principally carbon dioxide, but also containing small quantities of flammable gases including hydrogen and carbon monoxide may be flared if necessary, or taken to a gasification reactor designed to accept a relatively high carbon dioxide containing stream as a feed, if desired to minimize plant net carbon dioxide emissions. The higher boiling hydrocarbons left behind with the ash and char may be recovered through conventional methods such as vacuum distillation or solvent recovery. Char and other unreacted carbonaceous material from the liquefaction reactor may be used to supplement the carbonaceous feed to the gasification reactor.

WORKING EXAMPLE

A sample of synthetic petroleum was prepared in a 250 mL batch reactor by adding 6.4 g of powdered lignite coal, as received, that contained 4.4 g of dry ash free lignite coal and 1.35 g of included water. Next, 12 grams of water and 37 grams of crystalline zinc chloride were added to the reactor and mixed with the powdered coal. Synthesis gas containing 65% carbon monoxide and 35% hydrogen was added to bring the reactor to 888 psig at room temperature. The reactor was then sealed, attached to a shaker, and lowered into a fluidized sand-bath heater.

Figure 3:
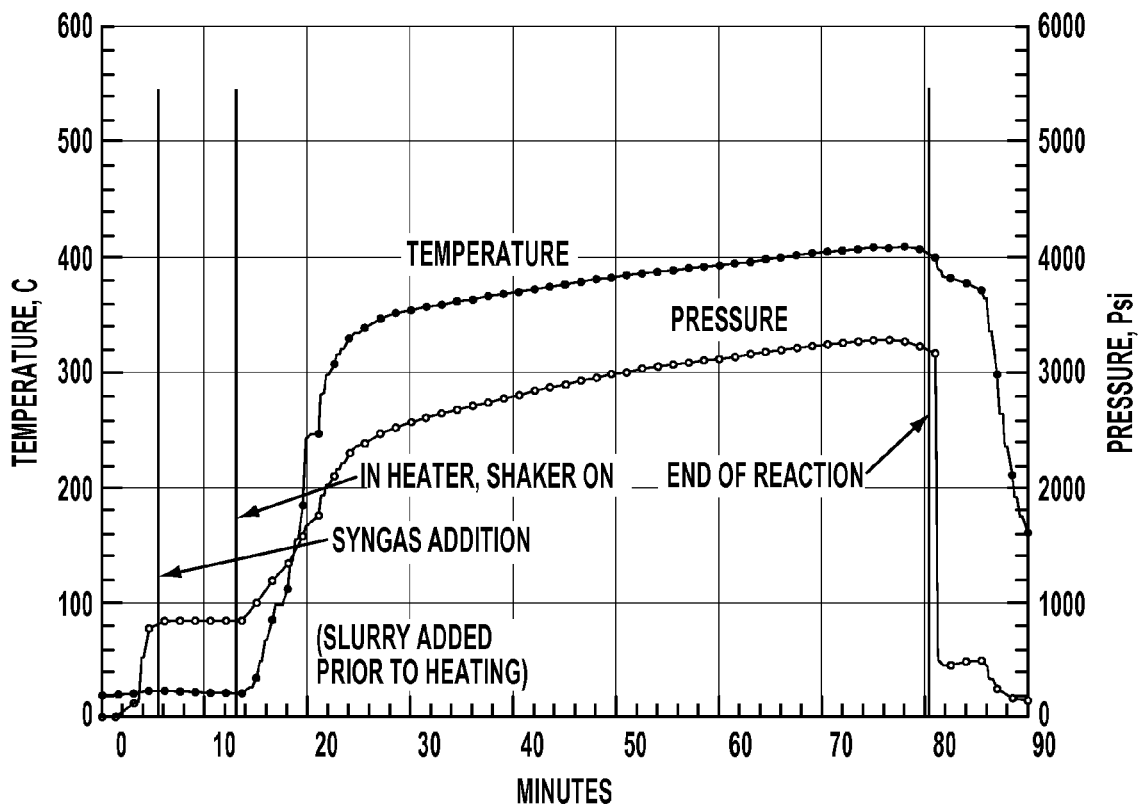
FIG. 3 is a time line graph of batch processing temperatures and pressures for the present invention as applied to the production of the example product, the kerosene-based jet fuel type JP-8.

FIG. 3 shows a time line graph of the temperature and pressure changes and other reaction events. The temperature and pressure were maintained in the indicated range for about 1.0 hour. After completing the reaction time, the reactor was removed from the heater and attached to an expansion vessel and the intervening valves were opened. The graph shows the abrupt pressure reduction at about 80 minutes while the reactor was still hot.

Figure 4:
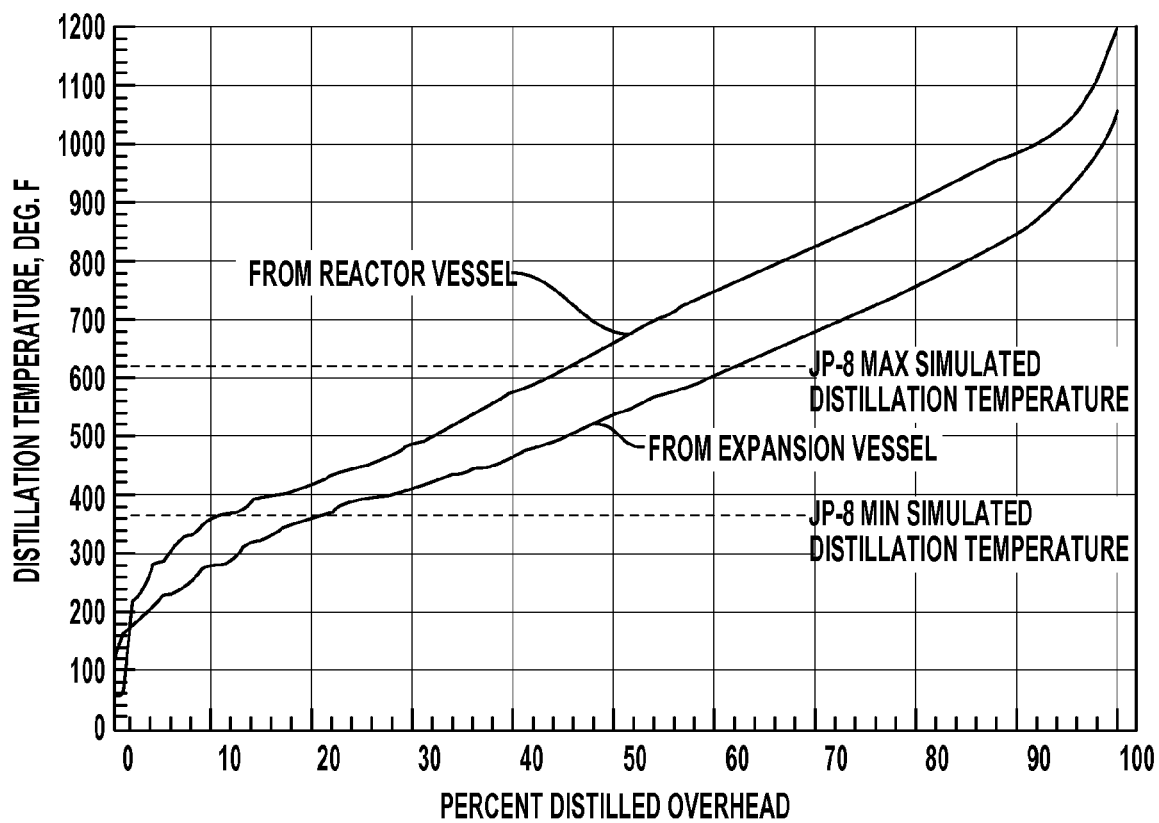
FIG. 4 is a simulated distillation curve for two products of the exemplary batch reaction.

After cooling the reactor and expansion vessels, two product samples were obtained from the reaction. The expansion vessel contained water with oil floating on the top. The reactor vessel contained the catalyst, char, and some additional oil that had not vaporized when the pressure was reduced. The additional oil in the reactor and the oil from the separator were each dissolved in carbon disulfide and analyzed for distillation properties by the simulated distillation method, a common procedure for characterizing petroleum and petroleum fractions. The results of both analyses are shown in FIG. 4, along with event horizons indicating the maximum and minimum limits for an exemplary product, jet fuel type JP-8. The results indicate that if a relatively large quantity of the product synthetic petroleum were to be refined, the yield of JP-8 could be as high as 40%. In addition, the products of the process herein, unlike those of conventional indirect liquefaction noted earlier, include hydrocarbons with cyclic chemical structures including aromatics (benzene, toluene) and/or cycloaliphatics (e.g. cyclohexane).

What is claimed is:

1. A process for the liquefaction of carbonaceous material in a liquefaction reactor comprising:
   (a) providing a carbonaceous material and separately feeding a portion to a gasification reactor and forming hydrogen and carbon monoxide gaseous products and separately feeding a portion of said carbonaceous material to said liquefaction reactor;
   (b) feeding the hydrogen and carbon monoxide gaseous products of the gasification reactor with water directly into said liquefaction reactor containing an inorganic metal halide salt wherein said products and materials undergo both of the following:
      (i) a water gas shift reaction wherein the carbon monoxide and water react to form carbon dioxide and hydrogen;
      (ii) a hydrogenation reaction of the carbonaceous material wherein said material is converted to a hydrocarbon;
      wherein said process for liquefaction of said carbonaceous material is conducted without the use of a separate reactor for reacting carbon monoxide with water to form carbon dioxide and hydrogen.

2. The process of claim 1 further comprising, in step (a), feeding one or more of water, carbon dioxide or oxygen to said gasification reactor.

3. The method of claim 1 wherein a portion of carbonaceous material fed to said gasification reactor remains unreacted and is fed to said liquefaction reactor.

4. The process of claim 1 wherein the carbonaceous material comprises a substrate material containing carbon at a level of greater than or equal to 50% by weight.

5. The process of claim 1 wherein the carbonaceous material comprises coal.

6. The process of claim 1 wherein the carbonaceous material includes biomass comprising plant or animal matter.

7. The process of claim 1 wherein said inorganic metal halide salt is selected from the group consisting of zinc chloride ($ZnCl_2$), zinc bromide ($ZnBr_2$), iron chloride ($FeCl_3$), tin chloride ($SnCl_2$), titanium chloride ($TiCl_2$), titanium tetrachloride ($TiCl_4$), bismuth chloride ($BiCl_3$) and mixtures thereof.

8. The process of claim 1 wherein the inorganic metal halide salt and carbonaceous material are present at a selected weight concentration to define a weight ratio of the metal halide salt to the carbonaceous material of greater than or equal to 1.0.

9. The process of claim 8 wherein the weight ratio is in the range of 1.0 to 10.0.

10. The process of claim 1 wherein said carbonaceous material is provided in a fluid slurry and the weight ratio of the inorganic metal halide salt to the water contained within said fluid is equal to or greater than 2.0.

11. The process of claim 1 wherein said liquefaction reactor is at a temperature of 250° C. to 750° C.

12. The process of claim 1 wherein said liquefaction reactor is at a pressure of 250 psi-7500 psi.

13. The process of claim 1 wherein the liquefaction reactor includes an organic liquid that can be hydrogenated and dehydrogenated.

14. The process of claim 1 wherein said contents of said gasification reactor that are fed into said liquefaction reactor comprises carbonaceous material, hydrogen and carbon monoxide.

15. The process of claim 1 wherein the hydrocarbon that is produced contains cyclic chemical structures comprising aromatic and/or cycloaliphatic structures.

16. The process of claim 1 wherein the inorganic metal halide salt comprises zinc chloride and wherein the zinc chloride and carbonaceous material are present at a selected weight concentration to define a weight ratio of the zinc chloride to the carbonaceous material of greater than or equal to 1.0, the liquefaction reactor temperature is 250° C. to 750° C. with a pressure of 250 psi-7500 psi.

17. The process of claim 16 further comprising, in step (a), feeding one or more of water, carbon dioxide or oxygen to said gasification reactor.

18. The process of claim 16 wherein the weight ratio is in the range of 1.0 to 10.0.

19. The process of claim 16 wherein said carbonaceous material is provided in a fluid slurry and the weight ratio of the zinc chloride to the water contained within said fluid is equal to or greater than 2.0.

20. The process of claim 16 wherein the liquefaction reactor includes an organic liquid that can be hydrogenated and dehydrogenated.

21. The process of claim 16 wherein said contents of said gasification reactor that are fed into said liquefaction reactor comprises carbonaceous material, hydrogen and carbon monoxide.

22. The process of claim 16 wherein the hydrocarbon that is produced contains cyclic chemical structures containing aromatic and/or cycloaliphatic structure.

23. The process of claim 1 wherein a portion of carbonaceous material fed to said gasification reactor forms a char and is fed to said liquefaction reactor.

* * * * *